US009052781B2

(12) United States Patent
Miyamoto et al.

(10) Patent No.: US 9,052,781 B2
(45) Date of Patent: Jun. 9, 2015

(54) POSITION DETECTION APPARATUS, POSITION DETECTION METHOD, MOBILE, AND RECEIVER (75) Inventors: Junichi Miyamoto, Minato-ku (JP); Hiroshi Kajitani, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 693 days.

(21) Appl. No.: 13/387,958
(22) PCT Filed: Apr. 21, 2010
(86) PCT No.: PCT/JP2010/057053
§ 371 (c)(1),
(2), (4) Date: Apr. 10, 2012
(87) PCT Pub. No.: WO2011/013418
PCT Pub. Date: Feb. 3, 2011

(65) Prior Publication Data
US 2012/0188847 A1  Jul. 26, 2012

(30) Foreign Application Priority Data
Jul. 31, 2009 (JP) ................. 2009-179020

(51) Int. Cl.
G06F 3/043 (2006.01)
G01S 11/16 (2006.01)

(52) U.S. Cl.
CPC .............. G06F 3/0433 (2013.01); G01S 11/16 (2013.01)

(58) Field of Classification Search
CPC .............................. G01S 11/16; G06F 3/0433
USPC ........................................................ 367/128
See application file for complete search history.

(56) References Cited

U.S. PATENT DOCUMENTS 5,940,346 A * 8/1999 Sadowsky et al. ............ 367/128
6,118,205 A 9/2000 Wood et al.
(Continued)

FOREIGN PATENT DOCUMENTS

JP 60176130 A 9/1985
JP 01289397 A 11/1989
(Continued)

OTHER PUBLICATIONS

Office Action issued by the Japanese Patent Office dated Jun. 26, 2013 in corresponding Application No. 2011-524688.
(Continued)

Primary Examiner — Luke Ratcliffe
Assistant Examiner — Hovhannes Baghdasaryan
(74) Attorney, Agent, or Firm — Sughrue Mion, PLLC (57) ABSTRACT To detect the positions of the respective mobiles correctly without being affected by the ultrasonic waves from other mobile(s) in a case where plural mobiles are used simultaneously.

The mobile comprises a unit that transmits a trigger signal of requesting transmitting ultrasonic wave that is capable of identifying the mobile, a unit that receives a trigger signal of allowing transmitting ultrasonic wave from the receiver, and a unit that transmits an ultrasonic wave immediately upon receipt of the trigger signal of allowing transmitting ultrasonic wave. The receiver comprises a unit that receives a trigger signal of requesting transmitting ultrasonic wave from the mobile, a unit that transmits a trigger signal of allowing transmitting ultrasonic wave that can be identified at the mobile side, a control unit that controls a transmitting timing of the trigger signal of allowing transmitting ultrasonic wave, at least two ultrasonic wave receiving units provided at predetermined gaps, a unit that calculates an ultrasonic wave propagation time from the mobile based on a time of transmitting the trigger signal of allowing transmitting ultrasonic wave and an ultrasonic wave arrival time, and a position calculation unit that calculates a position of the mobile based on the ultrasonic wave propagation time calculated.

8 Claims, 6 Drawing Sheets (56) References Cited

U.S. PATENT DOCUMENTS

| | | | |
|---|---|---|---|
| 6,327,219 B1* | 12/2001 | Zhang et al. | 367/128 |
| 2003/0003866 A1* | 1/2003 | Overy et al. | 455/41 |
| 2003/0142587 A1* | 7/2003 | Zeitzew | 367/127 |
| 2005/0105394 A1* | 5/2005 | Lee | 367/128 |
| 2006/0064013 A1* | 3/2006 | Ake et al. | 600/437 |
| 2007/0139157 A1 | 6/2007 | Inaba et al. | |
| 2008/0084789 A1* | 4/2008 | Altman | 367/127 |
| 2009/0219785 A1* | 9/2009 | Van "T Klooster et al. | 367/124 |

FOREIGN PATENT DOCUMENTS

| | | |
|---|---|---|
| JP | 02108397 A | 4/1990 |
| JP | 2002295892 A | 10/2002 |
| JP | 2003-279640 A | 10/2003 |
| JP | 2003-288157 A | 10/2003 |
| JP | 3551591 B2 | 5/2004 |
| JP | 2004151789 A | 5/2004 |
| JP | 2004-192142 A | 7/2004 |
| JP | 2004-199560 A | 7/2004 |
| JP | 2005-043337 A | 2/2005 |
| JP | 2008-107251 A | 5/2008 |
| JP | 2009-103476 A | 5/2009 |
| JP | 2009-162732 A | 7/2009 |
| WO | 2005098177 A1 | 10/2005 |
| WO | 2009084490 A1 | 7/2009 |

OTHER PUBLICATIONS

Office Action dated Feb. 27, 2014, issued by the Japan Patent Office in corresponding Japanese Patent Application No. 2011-524688.

* cited by examiner

ABSTRACT

POSITION DETECTION APPARATUS, POSITION DETECTION METHOD, MOBILE, AND RECEIVER

CROSS REFERENCE TO RELATED APPLICATIONS

This application is a National Stage of International Application No. PCT/JP2010/057053 filed Apr. 21, 2010, claiming priority based on Japanese Patent Application No. 2009-179020, filed Jul. 31, 2009, the contents of all of which are incorporated herein by reference in their entirety.

TECHNICAL FIELD

The present invention relates to a position detection apparatus, a position detection method, a mobile, and a receiver.

BACKGROUND ART

Figure 7:
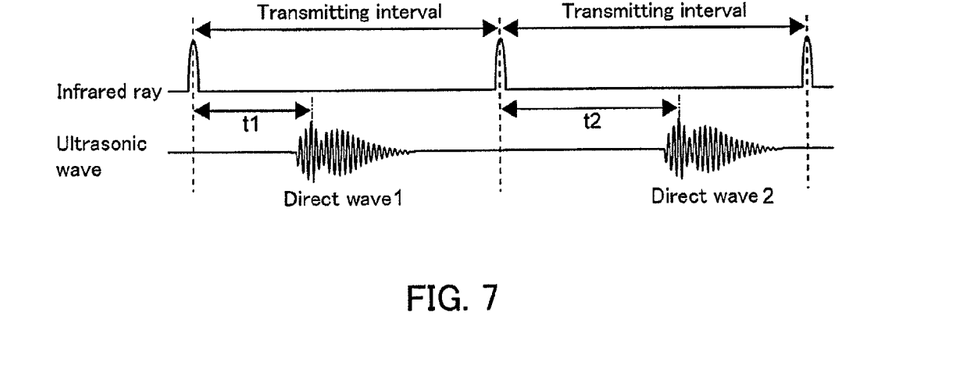
FIG. 7 is a view showing an example of the position detection method in a related art.

Methods and apparatuses of detecting the positions of mobiles such as a mobile robot and coordinate input devices such as an electronic pen and the like by using an ultrasonic wave and measuring the propagation time thereof have been proposed (see, for example, Patent Documents 1 to 3). In the position detection method utilizing the propagation time of ultrasonic wave, a mobile transmits an ultrasonic wave and an infrared ray at the same time at regular intervals and a receiver receives them. FIG. 7 shows an example of the signal detected by the receiver. In this example, the ultrasonic wave transmitted from the mobile is a signal of burst waveform and the signal of the same waveform is transmitted for every transmitting intervals. Since there is the difference in speed between the ultrasonic wave and the infrared ray, a time lag (for example, t1 and t2) occurs at the time of the receipt of them. The receiver first receives the infrared ray and then receives the ultrasonic wave that arrives later according to the propagation distance. Hence, the period of time between the receipt of the infrared ray and the receipt of the ultrasonic wave is measured as the propagation time of ultrasonic wave, and the position of the mobile is specified utilizing the propagation time.

According to this method, in the case where plural mobiles are used simultaneously, the receiver cannot identify each of the mobiles. Therefore, identification of the ultrasonic wave corresponding to a certain infrared ray signal is difficult and the coordinate cannot be detected normally. Further, in the state where plural mobiles are activated simultaneously, there is a possibility that the receiver receives ultrasonic waves transmitted from different mobiles at the same time. Since the ultrasonic wave transmitting signal is a signal of burst waveform, it is very difficult to separate the respective mixed ultrasonic waves, and it is difficult to detect the arrival time of each ultrasonic wave. Therefore, the position of the mobile cannot be detected correctly.

Hence, in order to identify each of the plural mobiles and detect the position thereof, a pen input device of simultaneously activating pens by transmitting ultrasonic waves in a time-divided manner has been proposed (see, for example, Patent Document 4). In this pen input device, by giving, with a stationary body, timing signals to pens at the time when the pens are inserted into pen holders, the clock at the stationary body side and the clock at the pen side are synchronized, and the time-division is achieved by dividing the timing signals to be given for each of the pens.

Figure 8:
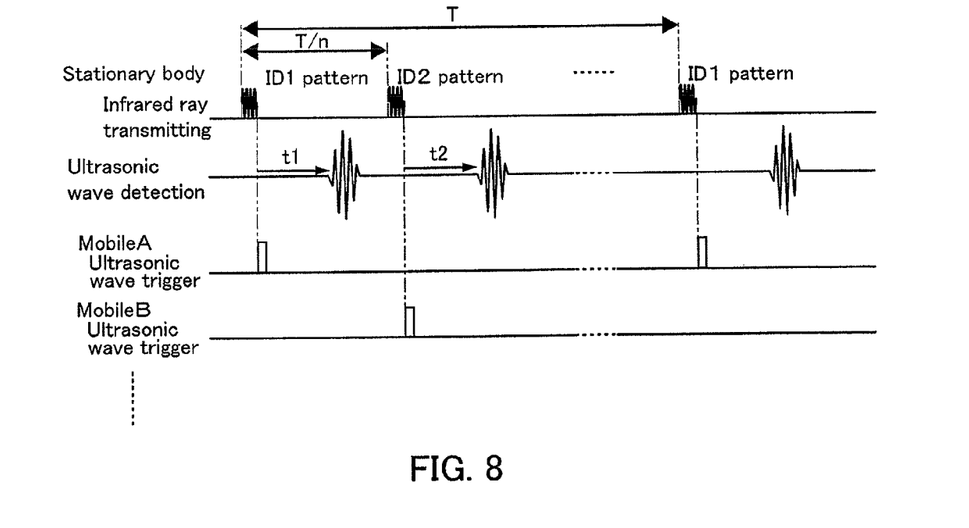
FIG. 8 is a view showing another example of the position detection method in a related art.

Further, as another example of identifying each of the plural mobiles and detecting the position thereof, a method of transmitting the infrared ray or the like after an infrared ray or the like has been applied with an unique identification signal has been proposed (see, for example, Patent Documents 5 and 6). In this position detection method, it is configured that a stationary body (receiver) transmits an electromagnetic wave signal such as an infrared ray signal including ID information, and the mobile transmits an ultrasonic wave only in the case where it receives the electromagnetic wave signal corresponding to its own ID. Here, the interval of transmitting the electromagnetic wave signal including the ID information is set longer than the period of time in which the ultrasonic wave moves in a maximum range of inputting coordinate. As shown in FIG. 8, if it is assumed that the number of mobiles to be used is n and the interval for measuring the coordinate is T, the time assigned to one of the mobiles T/n should be decided based on the relationship with the moving range. In the case where the handwriting written by an electronic pen is reproduced, T cannot be set long needlessly. For example, in the case where the drawing range is A4-size and T is 10 ms, since a maximum propagation distance of the ultrasonic wave is 350 mm and the propagation time of the ultrasonic wave is about 1 ms, when T/n is set as 2 ms in consideration of margin for not interrupting the time frames of other IDs, up to five mobiles can be used simultaneously. On the other hand, under the assumption that the electronic pen is used at a projected screen by a projector, since the furthermost point reaches 2 m and the propagation time is about 7 ms, two mobiles can be used simultaneously in consideration of margin under the condition of T=20 ms.

RELATED ART DOCUMENT

Patent Document

[Patent Document 1] U.S. Pat. No. 6,118,205
[Patent Document 2] JP 2003-288157 A
[Patent Document 3] JP 2005-43337 A
[Patent Document 4] Japanese Patent No. 3551591
[Patent Document 5] JP 2004-199560 A
[Patent Document 6] JP 2008-107251 A

SUMMARY OF INVENTION

Problem to be Solved by the Invention

However, in the method of achieving the time-division by synchronizing clocks described above, since a stationary body preliminarily gives a timing signal to a mobile for synchronization of the mobile and the stationary body, there is a problem that the deviation of the clocks between the mobile and the stationary body greatly affects the accuracy of coordinate detection. Further, there is a possibility that errors are accumulated with the passage of time.

Further, in the method of transmitting the infrared ray or the like after an infrared ray or the like has been applied with an unique identification signal described above, by taking a configuration in which one of the infrared ray and the ultrasonic wave is transmitted from the stationary body to the mobile, duplication of the time periods in which the mobiles transmit the signals can be prevented, and coexistence of plural mobiles is allowed. However, there is a need of transmitting the infrared ray or the ultrasonic wave even in the state where the mobiles are not in use, and this causes the increase in power consumption. On the other hand, a method in which power consumption is reduced by reducing the transmitting frequency of the signal from the stationary body is also disclosed. However, in the case where the transmitting of the signal from the stationary body is suspended and then restarted, a time lag corresponding to the interval of measuring the coordinate surely occurs. In particular, for example, in the case where the pen is used at the projected screen by a projector and the path of the pen is displayed on the projected screen sequentially, the point of starting writing is not drawn. In addition, since the coordinates for two points are required for drawing the path of the line, the delay corresponding to another interval occurs. Therefore, there is a problem that it is difficult for the user to handle the pen due to the rendering delay.

Hence, the present invention is intended to provide a position detection apparatus, a position detection method, a mobile, and a receiver capable of solving the aforementioned problems and detecting the position of each of the mobiles correctly and stably even in a case where plural mobiles are used simultaneously.

Means for Solving Problem

In order to achieve the aforementioned object, the position detection apparatus of the present invention comprises:
at least one mobile that transmits and receives a trigger signal and transmits an ultrasonic wave; and
a receiver that transmits and receives the trigger signal and receives the ultrasonic wave, wherein
  the mobile comprises:
    a trigger signal transmitting unit that transmits a trigger signal of requesting transmitting ultrasonic wave that is capable of identifying the mobile;
    a trigger signal receiving unit that receives a trigger signal of allowing transmitting ultrasonic wave from the receiver; and
    an ultrasonic wave transmitting unit that transmits an ultrasonic wave immediately upon receipt of the trigger signal of allowing transmitting ultrasonic wave, and
  the receiver comprises:
    a trigger signal receiving unit that receives the trigger signal of requesting transmitting ultrasonic wave from the mobile;
    a trigger signal transmitting unit that transmits the trigger signal of allowing transmitting ultrasonic wave that can be identified at the mobile side;
    a control unit that controls a transmitting timing of the trigger signal to the mobile;
    at least two ultrasonic wave receiving units provided at predetermined gaps that receive the ultrasonic wave transmitted by the mobile;
    a time calculation unit that detects an ultrasonic wave arrival time from the ultrasonic wave received and calculates an ultrasonic wave propagation time required for the ultrasonic wave to be arrived to each of the ultrasonic wave receiving units from the mobile based on a time of transmitting the trigger signal and the ultrasonic wave arrival time detected; and
    a position calculation unit that calculates a position of the mobile based on the ultrasonic wave propagation time calculated and gap lengths among the ultrasonic wave receiving units.

The position detection method of the present invention using the position detection apparatus of the present invention, comprises:
  a trigger signal transmitting step of transmitting a trigger signal of requesting transmitting ultrasonic wave that is capable of identifying the mobile from the mobile to the receiver;
  a trigger signal receiving step of receiving, with the receiver, the trigger signal of requesting transmitting ultrasonic wave from the mobile;
  a control step of controlling a transmitting timing of a trigger signal of allowing transmitting ultrasonic wave to the mobile;
  a trigger signal transmitting step of transmitting, with the receiver, the trigger signal of allowing transmitting ultrasonic wave that can be identified at the mobile side;
  a trigger signal receiving step of receiving, with the mobile, a trigger signal of allowing transmitting ultrasonic wave that can be identified by the mobile;
  an ultrasonic wave transmitting step of transmitting, with the mobile, an ultrasonic wave to the receiver immediately upon receipt of the trigger signal of allowing transmitting ultrasonic wave;
  a time calculation step of detecting an ultrasonic wave arrival time from the ultrasonic wave received and calculating an ultrasonic wave propagation time required for the ultrasonic wave to be arrived to each of the ultrasonic wave receiving units from the mobile based on a time of transmitting the trigger signal of allowing transmitting ultrasonic wave and the ultrasonic wave arrival time detected; and
  a position calculation step of calculating a position of the mobile based on the ultrasonic wave propagation time calculated and gap lengths among the ultrasonic wave receiving units.

The mobile of the present invention used for the position detection apparatus of the present invention, comprises:
  a trigger signal transmitting unit that transmits a trigger signal of requesting transmitting ultrasonic wave to a receiver;
  a trigger signal receiving unit that receives a trigger signal of allowing transmitting ultrasonic wave from the receiver; and
  an ultrasonic wave transmitting unit that transmits an ultrasonic wave immediately upon receipt of the trigger signal of allowing transmitting ultrasonic wave.

The receiver of the present invention used for the position detection apparatus of the present invention, comprises:
  a trigger signal receiving unit that receives a trigger signal of requesting transmitting ultrasonic wave from a mobile;
  a trigger signal transmitting unit that transmits a trigger signal of allowing transmitting ultrasonic wave that can be identified at the mobile side;
  a control unit that controls a transmitting timing of the trigger signal to the mobile;
  at least two ultrasonic wave receiving units provided at predetermined gaps that receive the ultrasonic wave transmitted by the mobile;
  a time calculation unit that detects an ultrasonic wave arrival time from the ultrasonic wave received and calculates an ultrasonic wave propagation time required for the ultrasonic wave to be arrived to each of the ultrasonic wave receiving units from the mobile based on a time of transmitting the trigger signal and the ultrasonic wave arrival time detected; and
  a position calculation unit that calculates a position of the mobile based on the ultrasonic wave propagation time calculated and gap lengths among the ultrasonic wave receiving units.

Effects of the Invention

The present invention can provided a position detection apparatus, a position detection method, a mobile, and a receiver capable of detecting the position of each of the mobiles correctly and stably even in a case where plural mobiles are used simultaneously.

DESCRIPTION OF EMBODIMENTS

Hereinafter, the position detection apparatus, position detection method, mobile, and receiver of the present invention will be described in detail. However, the present invention is not limited to the following embodiments.

Embodiment 1

Figure 1:
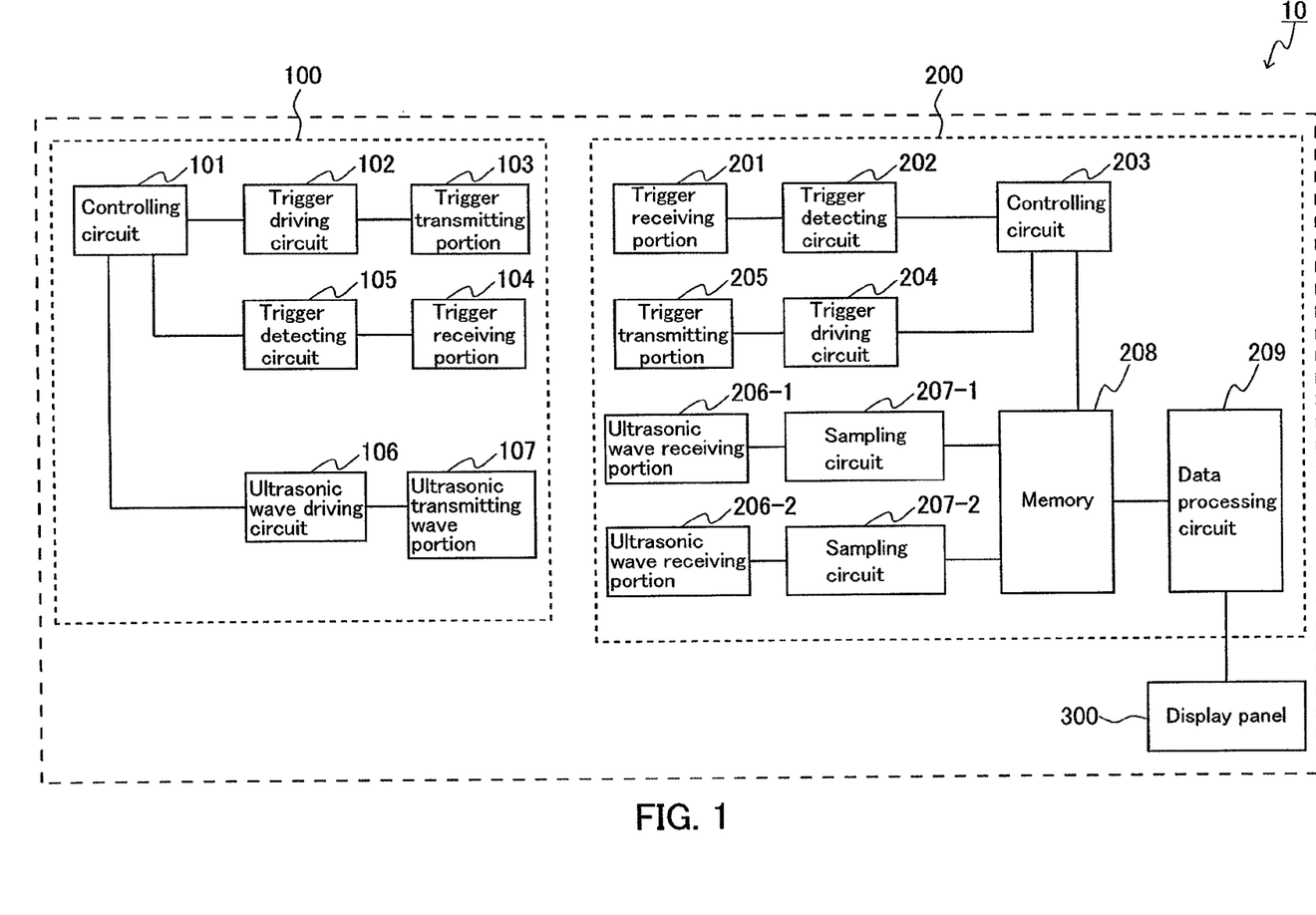
FIG. 1 is a block diagram showing an example of the configuration of the position detection apparatus of the present invention in Embodiment 1.
Figure 2:
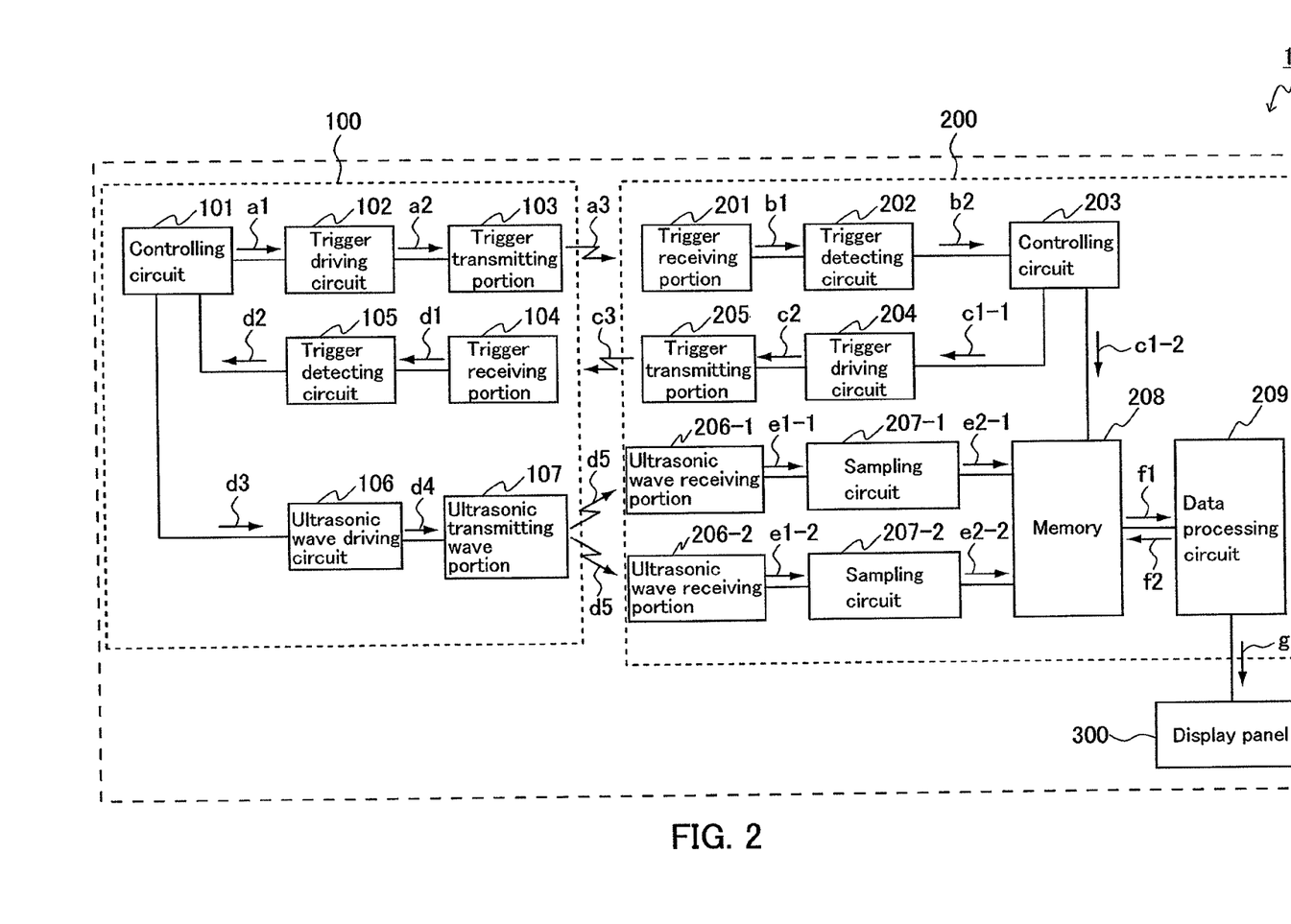
FIG. 2 is a block diagram showing an example of the configuration of the position detection apparatus of the present invention in Embodiment 1 in which the flow of the signals is indicated.

FIGS. 1 and 2 each show an example of the configuration of the position detection apparatus according to this Embodiment. As shown in FIGS. 1 and 2, this position detection apparatus 10 is provided with a mobile 100, a receiver 200, and a display panel 300. The receiver 200 is provided at a predetermined position distanced from the mobile 100, and the display panel 300 displays the path of the mobile 100. The display panel 300 may be a monitor commonly used, a large-screen display such as a liquid crystal display or a plasma display, or a projected screen projected by a projector.

The mobile 100 is provided with a controlling circuit 101, a trigger driving circuit 102, a trigger transmitting portion 103, a trigger receiving portion 104, a trigger detecting circuit 105, an ultrasonic wave driving circuit 106, and an ultrasonic wave transmitting portion 107. The controlling circuit 101 is electrically connected to the trigger driving circuit 102, the trigger detecting circuit 105, and the ultrasonic wave driving circuit 106. The trigger driving circuit 102 is electrically connected to the trigger transmitting portion 103. The trigger detecting circuit 105 is electrically connected to the trigger receiving portion 104. The ultrasonic wave driving circuit 106 is electrically connected to the ultrasonic wave transmitting portion 107. The controlling circuit 101, the trigger driving circuit 102, and the trigger transmitting portion 103 in this Embodiment correspond to "the trigger signal transmitting unit that transmits the trigger signal of requesting transmitting ultrasonic wave" of the present invention. The trigger receiving portion 104 and the trigger detecting circuit 105 in this Embodiment correspond to "the trigger signal receiving unit that receives the trigger signal of allowing transmitting ultrasonic wave from the receiver" of the present invention. The controlling circuit 101, the ultrasonic wave driving circuit 106, and the ultrasonic wave transmitting portion 107 in this Embodiment correspond to "the ultrasonic wave transmitting unit that transmits an ultrasonic wave immediately upon receipt of the trigger signal of allowing transmitting ultrasonic wave" of the present invention.

The receiver 200 is provided with a trigger receiving portion 201, a trigger detecting circuit 202, a controlling circuit 203, a trigger driving circuit 204, a trigger transmitting portion 205, ultrasonic wave receiving portions 206-1 and 206-2, sampling circuits 207-1 and 207-2, a memory 208, and a data processing circuit 209. The trigger receiving portion 201 is electrically connected to the trigger detecting circuit 202. The trigger detecting circuit 202 and the trigger driving circuit 204 are electrically connected to the controlling circuit 203. The trigger driving circuit 204 is electrically connected to the trigger transmitting portion 205. The ultrasonic wave receiving portion 206-1 is electrically connected to the sampling circuit 207-1, and the ultrasonic wave receiving portion 206-2 is electrically connected to the sampling circuit 207-2. The controlling circuit 203 and the sampling circuits 207-1 and 207-2 are electrically connected to the memory 208. The memory 208 is electrically connected to the data processing circuit 209.

The trigger receiving portion 201 and the trigger detecting circuit 202 in this Embodiment correspond to "the trigger signal receiving unit that receives the trigger signal of requesting transmitting ultrasonic wave from the mobile" of the present invention. The controlling circuit 203, the trigger driving circuit 204, and the trigger transmitting portion 205 in this Embodiment correspond to "the trigger signal transmitting unit that transmits the trigger signal of allowing transmitting ultrasonic wave" of the present invention. The controlling circuit 203 in this Embodiment corresponds to "the control unit" of the present invention. The ultrasonic wave receiving portions 206-1 and 206-2 and the sampling circuits 207-1 and 207-2 in this Embodiment correspond to "the ultrasonic wave receiving units" of the present invention.

The data processing circuit 209 is electrically connected to the display panel 300. The display panel 300 in this Embodiment corresponds to "the display unit" of the present invention.

Each of the controlling circuit 101 and controlling circuit 203 is provided with a central processing unit (CPU), for example. The control executed by the control unit will be described below. Here, for example, in the case where the mobile that configures the position detection apparatus of this Embodiment is provided with an operation portion, a display portion, a memory, and the like, for example, the controlling circuit 101 may be electrically connected to these members.

As for the trigger transmitting portions 103 and 205, for example, light-emitting diodes may be employed in the case where light is used as the trigger signal, and radio wave transmitters may be employed in the case where a radio wave is used as the trigger signal. As for the trigger receiving portions 104 and 201, for example, photodiodes may be employed in the case where the trigger signal to be received is light, and radio wave receiving antennas may be employed in the case where the trigger signal to be received is a radio wave.

The controlling circuit 101 outputs a signal of ordering generating a trigger signal to the trigger driving circuit 102 (a1). The trigger driving circuit 102 generates a trigger driving signal based on the order signal from the controlling circuit 101 (a2). The trigger transmitting portion 103 is driven by the trigger driving signal from the trigger driving circuit 102 and transmits a trigger signal to a space (a3). For example, this trigger signal is transmitted as a radio wave, which is an electromagnetic wave signal, or an infrared ray signal.

The trigger signal transmitted from the trigger transmitting portion 103 is a signal capable of identifying the mobile 100. In the case where plural mobiles 100 are used, for example, by using signals band-divided for each mobile 100 as the trigger signals for preventing the duplication of the trigger signals among plural mobiles, the mobile can be identified uniquely in the receiver 200.

The trigger receiving portion 104 receives the trigger signal from the receiver 200 (c3) and converts this trigger signal into an electrical signal and then outputs it as a trigger pulse (d1). When the trigger detecting circuit 105 detects the trigger pulse from the trigger receiving portion 104, the trigger detecting circuit 105 notifies the controlling circuit 101 of the detection of the trigger (d2).

When the controlling circuit 101 receives the notice of trigger detection from the trigger detecting circuit 105 (d2), the controlling circuit 101 outputs a signal of ordering generating ultrasonic wave to the ultrasonic wave driving circuit 106 (d3). The ultrasonic wave driving circuit 106 generates an ultrasonic wave driving signal based on the order signal from the controlling circuit 101 (d4). The ultrasonic wave transmitting portion 107 transmits the ultrasonic wave to a space by the driving signal from the ultrasonic wave driving circuit 106 (d5).

The trigger receiving portion 201 receives the trigger signal from the mobile 100 (a3) and converts this trigger signal into an electrical signal and then outputs it as a trigger pulse (b1). When the trigger detecting circuit 202 detects the trigger pulse from the trigger receiving portion 201, the trigger detecting circuit 202 notifies the controlling circuit 203 of the detection of the trigger including the information from which mobile the trigger signal has been transmitted (b2).

When the controlling circuit 203 receives the notice of trigger detection from the trigger detecting circuit 202 (b2), the controlling circuit 203 controls a transmitting timing and outputs a signal of ordering generating a trigger signal to the trigger driving circuit 204 (c1-1), and the memory 208 stores the output time of the signal of ordering generating the trigger signal as a trigger output time data (c1-2). The trigger driving circuit 204 generates a trigger driving signal based on the order signal from the controlling circuit 203 (c2). For example, as the control of the transmitting timing, preferably, the controlling circuit 203 checks whether or not it is under a status of receiving an ultrasonic wave from other mobiles and outputs a signal of ordering generating a trigger signal to the trigger driving circuit 204 if it is not under the status of receiving the ultrasonic wave, and the trigger driving circuit 204 generates a trigger driving signal based on the order signal from the controlling circuit 203.

The trigger transmitting portion 205 is driven by the trigger driving signal from the trigger driving circuit 204 and transmits a trigger signal to a space (c3). For example, this trigger signal is transmitted as a radio wave, which is an electromagnetic wave signal, or an infrared ray signal. Normally, the same electromagnetic wave signal as the trigger signal of the mobile 100 is used.

Here, the trigger signal transmitted from the trigger transmitting portion 205 is a signal that can be identified uniquely at the mobile 100 side. In the case where plural mobiles 100 are used, for example, by using signals band-divided for each mobile 100 as the trigger signals for preventing the duplication of the trigger signals among plural mobiles, the signal can be identified uniquely in the mobile 100.

The ultrasonic wave receiving portions 206-1 and 206-2, which are provided separated from each other at a predetermined gap, each receive the ultrasonic wave transmitted from the mobile 100 (d5), and the ultrasonic wave receiving portions 206-1 and 206-2 each convert the ultrasonic wave into an electrical signal and each output the electrical signal to the sampling circuits 207-1 and 207-2 (e1-1 and e1-2).

The sampling circuits 207-1 and 207-2 sample the electrical signals outputted from the ultrasonic wave receiving portions 206-1 and 206-2 at regular intervals and the memory 208 stores them sequentially (e2-1 and e2-2).

The data processing circuit 209 reads the ultrasonic waveform data received with the ultrasonic wave receiving portions 206-1 and 206-2 and stored in the memory 208 if needed (f1), and the data processing circuit 209 filters the data and the memory 208 stores the data in an ultrasonic waveform (f2).

Further, the data processing circuit 209 detects an ultrasonic wave arrival time from the ultrasonic wave data stored in the memory 208 of during the period of time from a time of outputting a signal of ordering generating a trigger signal stored in the memory 208 to a time after the lapse of a certain period of time, which was preliminarily set longer than the time required for the ultrasonic wave to be propagated in the maximum range (movable range) in which the mobile can be moved, and calculates the elapsed time from the trigger output time to the ultrasonic wave arrival time, i.e., an ultrasonic wave propagation time required for the ultrasonic wave to be arrived to the receiver 200 from the mobile 100 for each ultrasonic wave received with the ultrasonic wave receiving portions 206-1 and 206-2.

Further, the data processing circuit 209 calculates the position of the mobile 100 in the movable range based on the ultrasonic wave propagation time required for the ultrasonic wave to be arrived to the receiver 200 from the mobile 100 calculated for each ultrasonic wave received with the ultrasonic wave receiving portions 206-1 and 206-2 and the gap length between the ultrasonic wave receiving portions 206-1 and 206-2.

The data processing circuit 209 is electrically connected to the display panel 300, and the position of the mobile calculated can be displayed.

Figure 3:
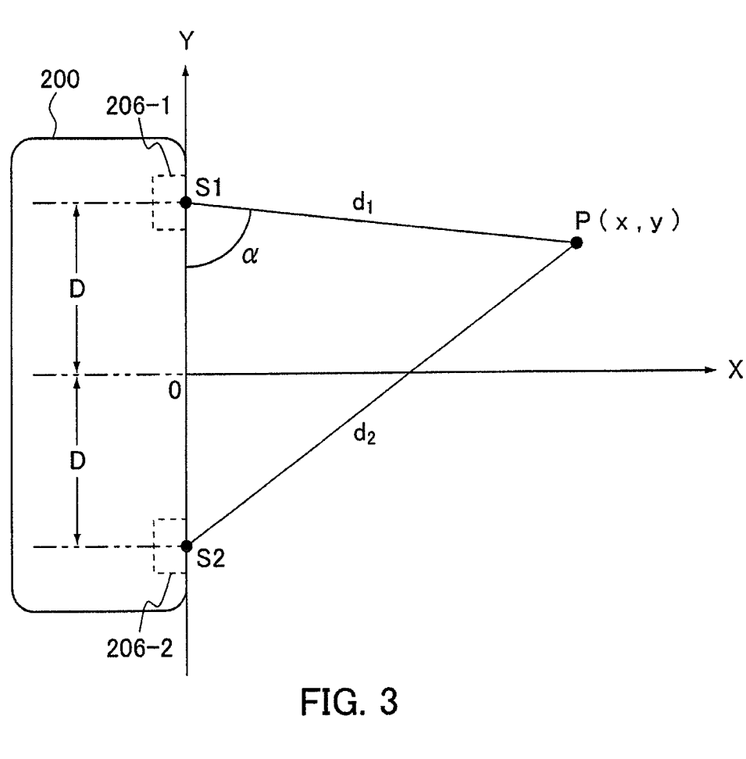
FIG. 3 is a view two-dimensionally showing a position calculation method of the mobile in Embodiment 1 of the present invention.

An example of the position calculation procedure by the data processing circuit 209 will be described hereinafter. FIG. 3 is a view two-dimensionally showing a position calculation method of the mobile 100 with reference to the ultrasonic wave receiving portions 206-1 and 206-2. In FIG. 3, the receiver 200 is provided at the left side of the movable range of the mobile 100, P denotes the position coordinate value (x,y) in the X-Y coordinate on the movable range of the mobile 100, and S1 and S2 denote the positions of the ultrasonic wave receiving portions 206-1 and 206-2 respectively.

Further, $d_1$ denotes the distance from the mobile 100 to the ultrasonic wave receiving portion 206-1 and $d_2$ denotes the distance from the mobile 100 to the ultrasonic wave receiving portion 206-2. D denotes the distance from the origin point in the Y-axis direction in the case where the center of the line connecting the ultrasonic wave receiving portions 206-1 and 206-2 is assumed as an original point in the X-Y coordinate. Further, a denotes the angle between the Y-axis and the line connecting the mobile 100 and the ultrasonic wave receiving portion 206-1.

Here, the propagation times of the ultrasonic waves received with the ultrasonic wave receiving portions 206-1 and 206-2 are t1 and t2, and the sonic speed is A. The distances $d_1$ and $d_2$ can be calculated with the equations $d_1 = A \times t1$ and $d_2 = A \times t2$. Since the relationship represented by the following equation (1) is held between the gap length between the ultrasonic wave receiving portions 206-1 and 206-2 (2D) and the distances $d_1$ and $d_2$, the position of mobile 100 (x,y) can be obtained by the following equation (2).

[Equation 1]

$$d_2^2 = (2D)^2 + d_2^2 - 2(2D)d_1\cos\alpha \quad (1)$$
$$\rightarrow d_1\cos\alpha = \frac{(2D)^2 + d_1^2 - d_2^2}{4D}$$

[Equation 2]

$$y = D - d_1\cos\alpha = \frac{d_2^2 - d_1^2}{4D} \quad (2)$$
$$x = \sqrt{d_1^2 - (D-y)^2}$$

As described above, the position of the mobile 100 can be decided correctly by the principle of the triangulation based on the propagation times of the ultrasonic waves received with the two ultrasonic wave receiving portions 206-1 and 206-2 of the receiver 200 and the gap length between the ultrasonic wave receiving portions 206-1 and 206-2.

The position information (x,y) of the mobile 100 calculated as described above is outputted to the display panel 300, and the position of the mobile 100 is displayed on the display panel 300 (g).

The position detection apparatus and the position detection method of this Embodiment can be used for an electronic pen system. In this case, the mobile is preferably an electronic pen. Further, the position detection apparatus and the position detection method of this Embodiment can be used for position detection in a robot system. In this case, the mobile is preferably a robot.

Embodiment 2

Figure 4:
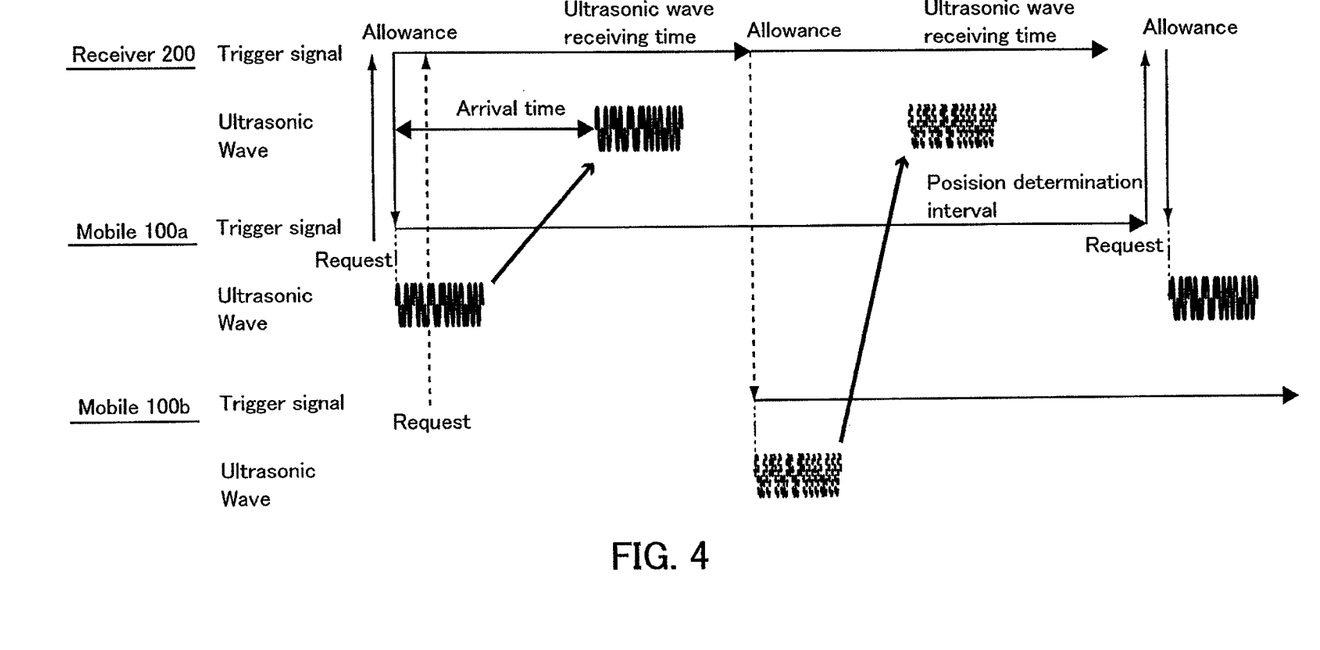
FIG. 4 is a view showing the operation of an example in which plural mobiles are used in Embodiment 2 of the present invention.

Next, with reference to FIG. 4, the position detection method in a case where plural mobiles are used will be described. In this Embodiment, the case in which two mobiles 100a and 100b are used will be described.

The mobile 100a transmits a trigger signal of requesting transmitting ultrasonic wave to the receiver 200 at the time of requesting position detection. When the receiver 200 receives the trigger signal of requesting transmitting ultrasonic wave from the mobile 100a, it checks the receipt status of the ultrasonic wave from the other mobile 100b. If it is not under a status of receiving the ultrasonic wave from the mobile 100b, the receiver 200 transmits allowance of transmitting ultrasonic wave by a trigger signal to the mobile 100a from which the receiver 200 has received the request for transmitting ultrasonic wave. Since each mobile transmits a signal that can be identified, the receiver can identify from which mobile the signal has been transmitted. A certain period of time from the time of transmitting a trigger signal of allowing transmitting ultrasonic wave (the certain period of time is set longer than the time required for the ultrasonic wave to be moved in the maximum range in which the mobile can be moved) is set as the ultrasonic wave receiving time, and this time period is referred to as a status of receiving the ultrasonic wave. During that time, the ultrasonic wave is received with the receiver using a mike or the like.

The mobile 100a, which received the allowance of transmitting ultrasonic wave by the trigger signal, transmits an ultrasonic wave. After the lapse of the ultrasonic wave receiving time, the receiver 200 detects the ultrasonic wave arrival time from the ultrasonic wave received and calculates the ultrasonic wave propagation time based on the elapsed time from the time of transmitting the trigger signal of allowing transmitting ultrasonic wave.

On the other hand, if the receiver 200 receives the trigger signal of requesting transmitting ultrasonic wave from a second mobile during receiving ultrasonic wave, after the lapse of the ultrasonic wave receiving time of a first mobile transmitting ultrasonic wave at that time, the receiver 200 transmits the trigger signal of allowing transmitting ultrasonic wave to the second mobile and receives the ultrasonic wave from the second mobile using a mike or the like. In the case where two mobiles transmit the trigger signals of requesting transmitting ultrasonic wave at the same time, a first mobile immediately transmits an ultrasonic wave in response to the allowance of transmitting ultrasonic wave whereas a second mobile transmits an ultrasonic wave after waiting the lapse of the ultrasonic wave receiving time of the first mobile.

As described above, by controlling the transmitting timing of ultrasonic wave from the mobile, the receiver can receive an ultrasonic wave while identifying from which mobile the ultrasonic wave has been transmitted. Each mobile, in its use, repeats a series of operations of transmitting and receiving trigger and transmitting ultrasonic wave at regular intervals from the time of receiving allowance of transmitting ultrasonic wave by a trigger signal from the receiver at the time of starting detection. Thereby, with respect to the plural mobiles, the paths thereof can be detected sequentially with great accuracy.

Here, in the case where the signal of identifying the mobile is an electromagnetic wave signal of a specific band, it is also preferable that the mobile can transmit the electromagnetic wave signals of plural specific bands. In this case, since the identification signal of each mobile can be changed according to the combination of the mobiles that used simultaneously, the identification signals can be prevented from being overlapped.

Embodiment 3

In the following embodiment, the case in which the position detection apparatus of the present invention is applied to an electronic pen system will be described.

In this Embodiment, the mobile that configures the position detection apparatus of the present invention is an electronic pen. The electronic pen is an input device that senses the position of the pen tip in real time by transmitting a signal from the pen tip and receiving the signal with the receiver. The path may be displayed on the display panel by scanning on the display panel or may be displayed on the display panel by scanning on a scanning region other than the display panel.

Figure 5:
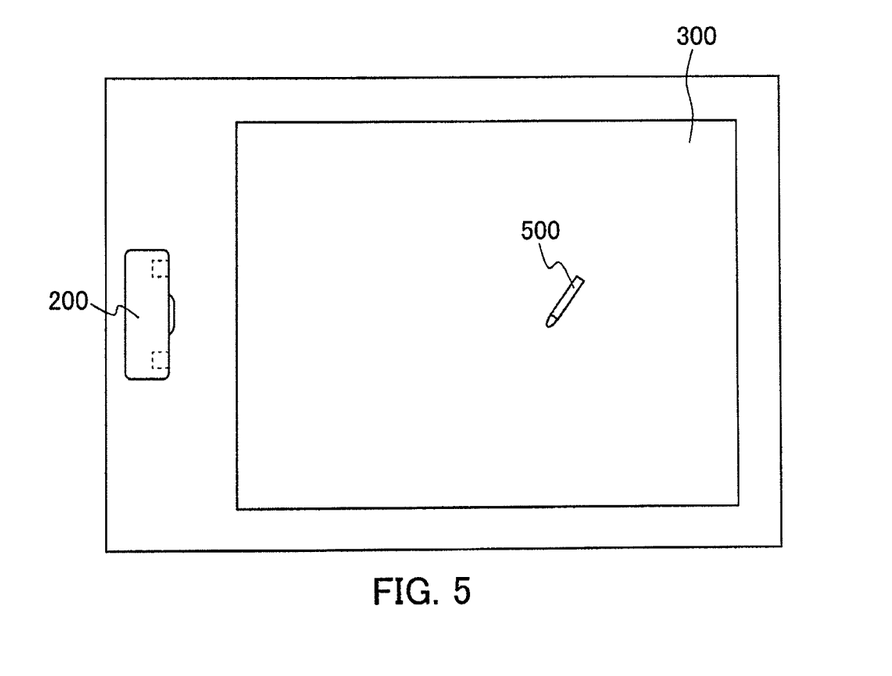
FIG. 5 is a view showing an example of the configuration of the position detection apparatus of the present invention in Embodiment 3.

FIG. 5 shows an example of the configuration of the position detection apparatus according to this Embodiment. As shown in FIG. 5, the position detection apparatus of this Embodiment is provided with an electronic pen, a receiver provided at a predetermined position distanced from the electronic pen, and a display panel that displays the path drawn by the electronic pen. In this example, an electronic pen 500 is used on a display panel 300. The display panel 300 may be a commonly used monitor, a large-screen display such as a liquid crystal display or a plasma display, or a projected screen projected by a projector.

The electronic pen 500 is provided with a controlling circuit 101, a trigger driving circuit 102, a trigger transmitting portion 103, a trigger receiving portion 104, a trigger detecting circuit 105, an ultrasonic wave driving circuit 106, and an ultrasonic wave transmitting portion 107. The operations of the respective members are the same as those described in Embodiment 1.

The configurations except for there are the same as those described in Embodiments 1 and 2.

The trigger signal transmitted from the trigger transmitting portion 103 is a single that can identify each electronic pen 500 uniquely. In the case where plural electronic pens are used, as the trigger signals, for example, signals band-divided for each electronic pen are used for preventing the duplication of the trigger signals among plural electronic pens.

Each electronic pen, when it is in use, transmits request of transmitting ultrasonic wave by a trigger signal to a receiver. Determination of whether or not the electronic pen is in use can be made by providing a switch at the pen tip for sensing, for example. This switch may be configured such that it turns on when recording (pressing) to the display panel 300 is started and it turns off when the recording is finished. When the switch is turned on in response to the pressing to the display panel 300, the electronic pen transmits request of transmitting ultrasonic wave by a trigger signal to the receiver 200.

In the case where the electronic pen is used on the display panel, by establishing correspondences between the position information of the electronic pen calculated and the display position of the display panel, the path can be displayed at the position corresponding to the pen tip and the electronic pen can be operated just like actual pen writing.

In the case where plural electronic pens are used, position detection of the pen tip may be performed by the method described in Embodiment 2.

Each electronic pen, in its use, repeats a series of operations of transmitting and receiving trigger and transmitting ultrasonic wave at regular intervals from the time of receiving allowance of transmitting ultrasonic wave by a trigger signal from the receiver at the time of starting use. Thereby, also with respect to the plural electronic pens, the paths thereof can be drawn sequentially with great accuracy.

Plural electronic pens can be used on the same display panel. Further, by using plural scanning regions other than the display panel, the paths drawn using different electronic pens on the respective scanning regions can be displayed on the same display panel. Also, the paths each drawn on the display panel and the scanning regions other than the display panel can together be displayed on the display panel. In the case where the plural scanning regions are used, each of the scanning regions is preferably provided with ultrasonic wave receiving portions.

Further, in addition to identification information, information about an electronic pen can be added to a trigger signal transmitted from the electronic pen. As an example, the electronic pen is configured so that information required for drawing can be set. For example, the electronic pen is configured to be capable of setting colors, and the present color information is transmitted to a receiver by a trigger signal. The receiver can change the color of the pen on the basis of that information. Other than this, the line width and the color intensity can be transmitted by a trigger signal. In addition, by providing a pressure sensor, pressure applied to the pen tip can be transmitted by a trigger signal. If the electronic pen is configured to be capable of changing setting of information required for drawing, for example, the color of the drawing can be changed during the use of the same electronic pen, for example, from black to red. An eraser can be set as the information required for drawing.

Also, by adding a temperature sensor to the electronic pen, information of the present temperature obtained can be transmitted to the receiver by a trigger signal. On the basis of the information, the receiver calculates the sonic speed appropriate to the present temperature. Thereby, the receiver can calculate a propagation time with higher accuracy.

Embodiment 4

In the following embodiment, the case in which the position detection apparatus of the present invention is applied to a robot system will be described.

In this Embodiment, the mobile that configures the position detection apparatus of the present invention is a robot. By setting a receiver on a ceiling or a wall of a certain space, the position of the robot in the space can be detected. By grasping the position of the robot in the space, the position detection apparatus can be used in purpose of collision avoidance by controlling the robot.

Figure 6:
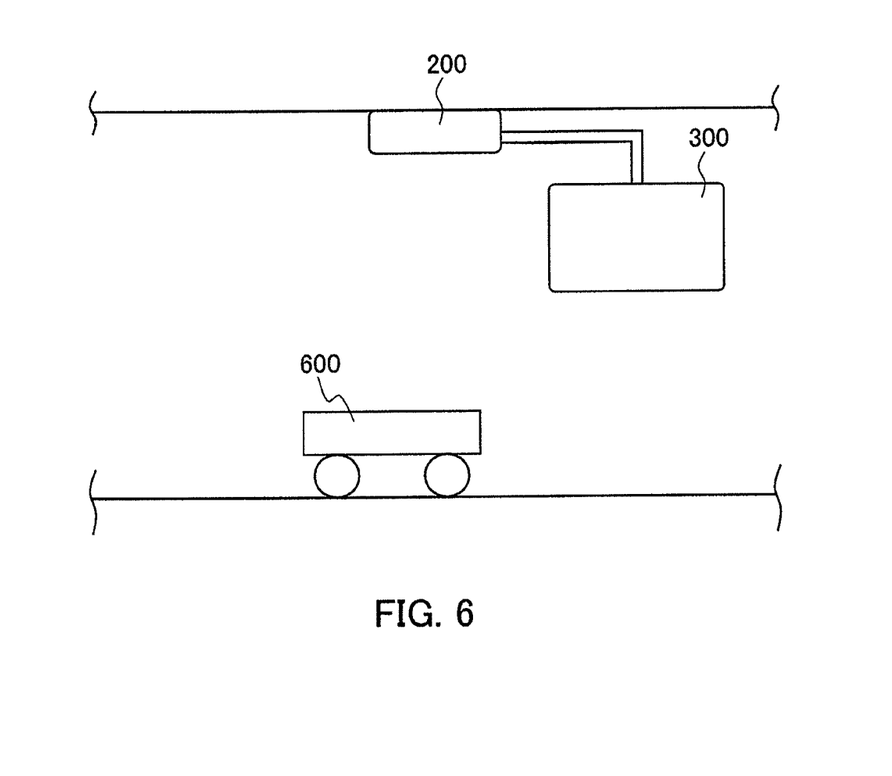
FIG. 6 is a view showing an example of the configuration of the position detection apparatus of the present invention in Embodiment 4.

FIG. 6 shows an example of the configuration of the position detection apparatus according to this Embodiment. As shown in FIG. 6, the position detection apparatus of this Embodiment is provided with a robot, a receiver provided at a predetermined position in a robot moving space, and a display panel that displays the movement locus of the robot. The display panel 300 may be a commonly used monitor, a large-screen display such as a liquid crystal display or a plasma display, or a projected screen projected by a projector.

The robot 600 is provided with a controlling circuit 101, a trigger driving circuit 102, a trigger transmitting portion 103, a trigger receiving portion 104, a trigger detecting circuit 105, an ultrasonic wave driving circuit 106, and an ultrasonic wave transmitting portion 107. The operations of the respective members are the same as those described in Embodiment 1.

The receiver 200 is the same as that described in Embodiment 1.

Each robot, when it is started to move, transmits request for transmitting ultrasonic wave by a trigger signal to a receiver, for example. The movement status of the robot may be determined by installing a sensor for sensing the movement in the robot, sensing the start of the movement by the sensor, and transmitting the electrical signal to the trigger driving circuit from the sensor.

This Embodiment can be performed in the same manner as in Embodiments 1 and 2 except that a robot is used as the mobile.

In the robot system, since the moving space of the robot is large, preferably, a temperature sensor is added to the robot to obtain information of the present temperature and the information is transmitted to the receiver by a trigger signal. On the basis of the information, the receiver calculates the sonic speed appropriate to the present temperature. Thereby, the receiver can calculate a propagation time with higher accuracy.

The invention of the present application was described above with reference to the preffered embodiments. However, the invention of the present application is not limited to the above-described Embodiments. Various changes that can be understood by those skilled in the art can be made in the configurations and details of the invention within the scope of the invention. For example, by affixing a mobile to a human or the like and by setting a receiver on a ceiling or a wall of a certain space, the position detection apparatus can be used also in purpose of traffic line detection and position-tracking in the space.

This application claims priority from Japanese Patent Application No. 2009-179020 filed on Jul. 31, 2009. The entire subject matter of the Japanese Patent Applications is incorporated herein by reference.

EXPLANATION OF REFERENCE NUMERALS 10 position detection apparatus
100, 100a, and 100b mobile
101 controlling circuit
102 trigger driving circuit
103 trigger transmitting portion
104 trigger receiving portion
105 trigger detecting circuit
106 ultrasonic wave driving circuit
107 ultrasonic wave transmitting portion
200 receiver
201 trigger receiving portion
202 trigger detecting circuit
203 controlling circuit
204 trigger driving circuit
205 trigger transmitting portion
206-1 and 206-2 ultrasonic wave receiving portion
207-1 and 207-2 sampling circuit
208 memory
209 data processing circuit
300 display panel
500 electronic pen
600 robot

The invention claimed is:

1. A position detection apparatus comprising:
    at least one mobile that transmits and receives a trigger signal and transmits an ultrasonic wave; and
    a receiver that transmits and receives the trigger signal and receives the ultrasonic wave, wherein
    the mobile comprises:
        a trigger signal transmitting unit that transmits a trigger signal of requesting transmitting ultrasonic wave that is capable of identifying the mobile;
        a trigger signal receiving unit that receives a trigger signal of allowing transmitting ultrasonic wave from the receiver; and
        an ultrasonic wave transmitting unit that transmits an ultrasonic wave after receiving the trigger signal of allowing transmitting ultrasonic wave, the receiver comprises:
        a trigger signal receiving unit that receives the trigger signal of requesting transmitting ultrasonic wave from the mobile;
        a trigger signal transmitting unit that transmits the trigger signal of allowing transmitting ultrasonic wave that can be identified at the mobile side;
        a control unit that controls a transmitting timing of the trigger signal to the mobile;
        at least two ultrasonic wave receiving units, provided separated from each other by predetermined gaps, that receive the ultrasonic wave transmitted by the mobile;
        a time calculation unit that calculates an ultrasonic wave propagation time required for the ultrasonic wave to be arrived to each of the ultrasonic wave receiving units from the mobile based on a time of transmitting the trigger signal and the ultrasonic wave arrival time detected; and
        a position calculation unit that calculates a position of the mobile based on the ultrasonic wave propagation time calculated and gap lengths among the ultrasonic wave receiving units;
    wherein at least one of the trigger signal of requesting transmitting ultrasonic wave and the trigger signal of allowing transmitting ultrasonic wave is an electromagnetic wave signal that is frequency band-divided for each of a plurality of mobiles, for preventing duplication of the trigger signal of requesting transmitting ultrasonic wave and the trigger signal of allowing transmitting ultrasonic wave; and
    wherein the mobile is configured to transmit an electromagnetic wave signal in each of a plurality of specific frequency bands.

2. The position detection apparatus according to claim 1, wherein the mobile is an electronic pen.

3. The position detection apparatus according to claim 1, wherein the mobile is a robot.

4. The position detection apparatus according to claim 1, further comprising a display unit that displays the position of the mobile calculated.

5. A position detection method using the position detection apparatus according to claim 1, comprising:
    a trigger signal transmitting step of transmitting a trigger signal of requesting transmitting ultrasonic wave that is capable of identifying the mobile from the mobile to the receiver;
    a trigger signal receiving step of receiving, with the receiver, the trigger signal of requesting transmitting ultrasonic wave from the mobile;
    a control step of controlling a transmitting timing of a trigger signal of allowing transmitting ultrasonic wave to the mobile;
    a trigger signal transmitting step of transmitting, with the receiver, the trigger signal of allowing transmitting ultrasonic wave that can be identified at the mobile side;
    a trigger signal receiving step of receiving, with the mobile, a trigger signal of allowing transmitting ultrasonic wave that can be identified by the mobile;
    an ultrasonic wave transmitting step of transmitting, with the mobile, an ultrasonic wave to the receiver after receiving the trigger signal of allowing transmitting ultrasonic wave;
    a time calculation step of calculating an ultrasonic wave propagation time required for the ultrasonic wave to be arrived to each of the ultrasonic wave receiving units from the mobile based on a time of transmitting the trigger signal of allowing transmitting ultrasonic wave and the ultrasonic wave arrival time detected; and
    a position calculation step of calculating a position of the mobile based on the ultrasonic wave propagation time calculated and gap lengths among the ultrasonic wave receiving units;
    at least one of transmitting the trigger signal of requesting transmitting ultrasonic wave and the receiving the trigger signal of requesting transmitting ultrasonic wave comprises transmitting or receiving an electromagnetic wave signal that is frequency band-divided for each of a plurality of mobiles, for preventing duplication of the trigger signal of requesting transmitting ultrasonic wave;
    wherein the mobile is configured to transmit an electromagnetic wave signal in each of a plurality of specific frequency bands.

6. The position detection method according to claim 5, wherein in the control step, in the case where the trigger signal of requesting transmitting ultrasonic wave from the mobile is received, a receipt status of ultrasonic wave from other mobile(s) is checked, and the trigger signal of allowing transmitting ultrasonic wave that can be identified at the mobile side is transmitted if it is not under a status of receiving the ultrasonic wave.

7. The position detection method according to claim 5, further comprising a display step of displaying the position of the mobile calculated.

8. A mobile used for the position detection apparatus according to claim 1, comprising:
- a trigger signal transmitting unit that transmits a trigger signal of requesting transmitting ultrasonic wave to a receiver;
- a trigger signal receiving unit that receives a trigger signal of allowing transmitting ultrasonic wave from the receiver; and
- an ultrasonic wave transmitting unit that transmits an ultrasonic wave after receiving the trigger signal of allowing transmitting ultrasonic wave;
- wherein at least one of the trigger signal of requesting transmitting ultrasonic wave and the trigger signal of allowing transmitting ultrasonic wave is an electromagnetic wave signal of a specific frequency band;
- wherein the mobile further comprises a change unit that changes the specific frequency band; and
- wherein the mobile is configured to transmit an electromagnetic wave signal in each of a plurality of specific frequency bands.

\* \* \* \* \*